United States Patent

[11] 3,612,366

| [72] | Inventors | Herbert J. Schneider<br>509 Airline Road;<br>Daniel J. Kedrowski, 309 N. Division St.,<br>both of Stevens Point, Wis. 54481 |
| --- | --- | --- |
| [21] | Appl. No. | 27,075 |
| [22] | Filed | Apr. 9, 1970 |
| [45] | Patented | Oct. 12, 1971 |

[54] SNOWMOBILE CARRIERS FOR AUTOMOBILES
6 Claims, 2 Drawing Figs.

[52] U.S. Cl. .................................................... 224/42.08,
214/4.50, 214/85.1
[51] Int. Cl. ........................................................ B60r 19/02
[50] Field of Search ............................................ 214/450;
224/29, 42.41, 42.08, 42.07, 42.03 R

[56] References Cited
UNITED STATES PATENTS

| 3,527,371 | 9/1970 | Townsend, Jr. ............ | 224/42.1 E |
| --- | --- | --- | --- |
| 3,515,323 | 6/1970 | Gilbert ........................ | 224/42.08 |
| 3,170,583 | 2/1965 | Meyer ......................... | 214/450 |

Primary Examiner—Gerald M. Forlenza
Assistant Examiner—John Mannix
Attorneys—Joseph G. Werner, Theodore J. Long, John M. Winter and James A. Kemmeter ABSTRACT: A carrier for transporting snowmobiles and boats on the rear deck area of an automobile. A generally U-shaped support frame is mounted on the trailer hitch assembly of the automobile. The carrier platform is supported on the U-shaped frame, on a forward cross-support assembly mounted on the roof of the automobile, and on a vertically adjustable intermediate cross-support bar mounted on the rear deck of the automobile. The platform is pivotally connected at the forward cross-support whereby the platform may be pivoted upwardly to permit access to the trunk of the automobile. Removable V-rollers are provided on the platform for hauling boats. A winch mechanism and a ramp are provided for loading.

SNOWMOBILE CARRIERS FOR AUTOMOBILES

FIELD OF THE INVENTION

Our invention relates to automobile mounted carriers for snowmobiles, boats and the like.

SUMMARY OF THE INVENTION

Basically, our invention comprises a carrier for transporting snowmobiles and boats on the rear deck of an automobile equipped with a trailer hitch assembly. A support frame is mounted on the trailer hitch and secured to the rear bumper. A winch-equipped carrier platform is supported on the frame, on a forward cross-support attached to the roof of the automobile, and on a vertically adjustable intermediate cross-support mounted on the rear fenders of the automobile.

The unique carrier construction provides many advantages over known transporting means including both carriers and trailers. Our carrier is designed for carrying either a snowmobile or boat with most of the weight thereof on the rear axle of the automobile to provide increased traction. This, of course, is particularly advantageous during the snowmobiling season.

A pivotal connection between the carrier platform and the forward cross-support member permits access to the trunk compartment without removing the entire carrier.

The carrier, while utilizing the trailer hitch assembly for support, does not interfere with the use of the hitch assembly for simultaneously pulling a trailer.

The vertically adjustable intermediate cross-support member permits use of the carrier with automobiles having various rear deck designs. This feature also provides means for distributing the weight between the intermediate support member and the rear support frame to remove some of the weight from the trailer hitch, if desired, when a trailer is also being transported.

DESCRIPTION OF THE PREFERRED EMBODIMENTS

Figure 1:
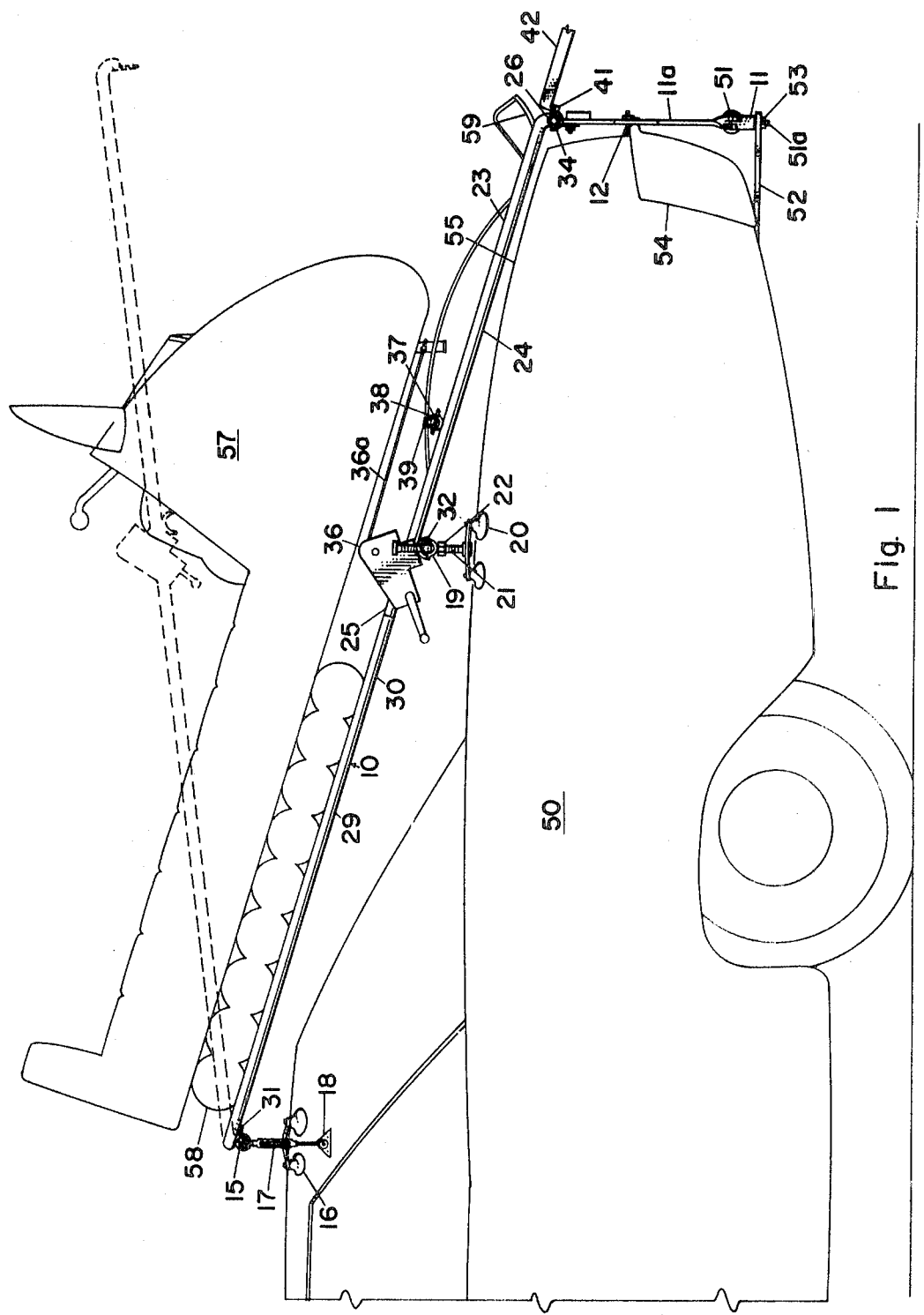
FIG. 1 is a fragmentary side elevation view showing a snowmobile carrier embodying our invention mounted on an automobile.
Figure 2:
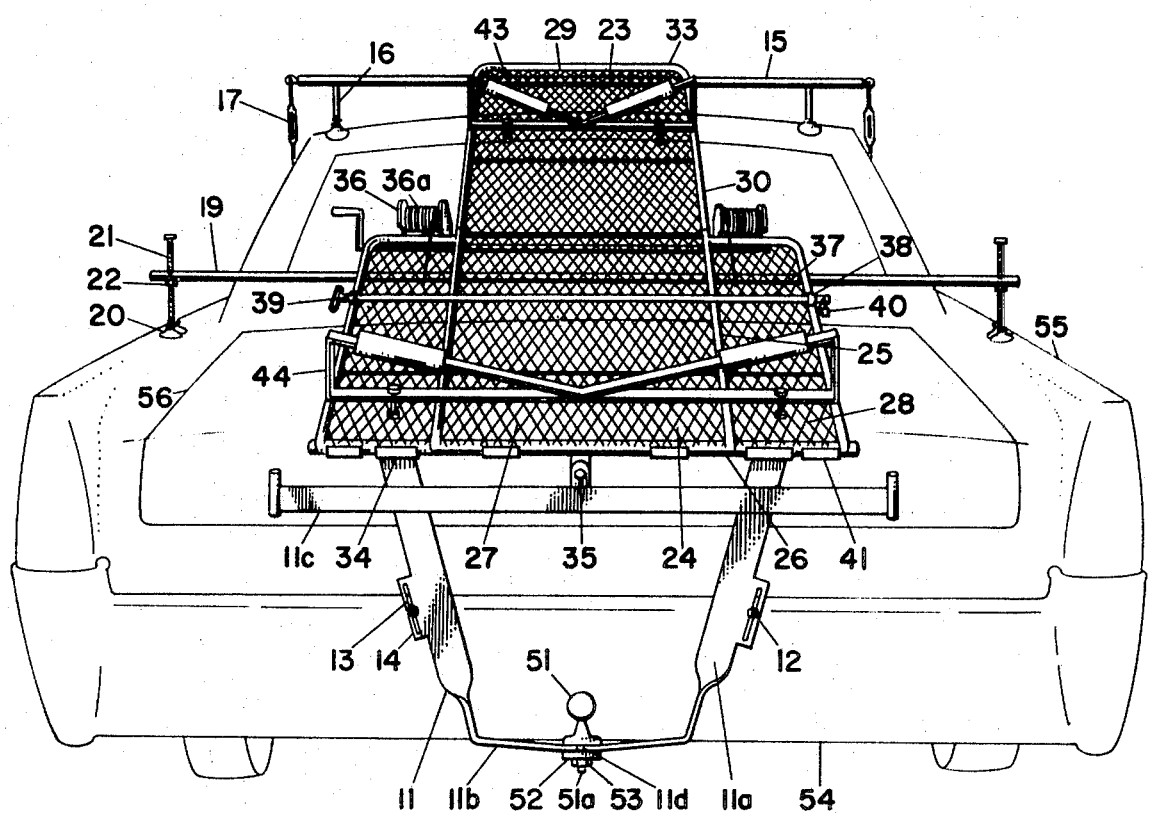
FIG. 2 is a rear elevation view of a snowmobile carrier embodying our invention with boat hauling rollers attached thereto.

Referring now more particularly to the drawings wherein like numerals refer to like parts in FIGS. 1 and 2, our carrier is shown generally at 10 mounted on an automobile 50. FIG. 1 shows a snowmobile 57 positioned on the carrier while FIG. 2 shows the carrier equipped with roller assemblies 43 and 44 for carrying a boat (not shown).

The carrier comprises a generally U-shaped iron support frame 11 having a pair of upstanding arms 11a connected by a web portion 11b and a cross brace 11c. The web has an aperture 11d formed therein for receiving the threaded stud portion 51a of a ball-hitch member 51. To mount the U-shaped frame 11, the ball-hitch member 57 is removed from the trailer-hitch support arm 52 and the web portion 11b of the frame is placed on arm 52. The ball-hitch member is then replaced by inserting the threaded stud portion 51a thereof through aperture 11d and secured on arm 52 by the ball-hitch nut 53.

Each frame arm 11a is secured to the rear bumper 54 of the automobile by a threaded J-stud 12 hooked over the top edge of the rear bumper. The J-studs 12 extend through vertical slots 13 formed in flanges 14 on the support arms 11a. The adjusting slots 13 permit the frame 11 to be properly mounted on automobiles having various distances between the trailer-hitch support arm and the top of the bumper. The U-shaped supporting frame 11 is thus securely mounted in substantially upright position at the rear of the automobile without interfering with the normal use of the trailer-hitch assembly.

As shown in FIG. 2, the ends of cross brace 11c may extend beyond the upright arms 11a of the frame and carry means thereon for supporting a detachable article carrier (not shown) if desired.

A forward cross-support member 15 is mounted on the roof of the automobile by suction cup mounts 16 secured by a turnbuckle assembly 17 to the roof of the automobile. The turnbuckle assembly can be secured to the rain gutter of an automobile in the known manner or to plates such as shown at 18 installed on the sides of the roof of the automobile.

An intermediate cross-support member 19 is mounted across the rear deck area of the automobile by a second pair of suction cup assemblies 20 positioned on the rear fenders 55 of the automobile. These suction cup assemblies 20 each have an upright threaded stud 21 on which cross-support member 19 is mounted for vertical adjustment thereon. The height of cross-support member 19 is adjusted by changing the position of elevation nuts 22.

While the suction cup assemblies 20 are shown positioned on the rear fenders 55 of the automobile, it is understood that they could be moved inwardly to rest on the trunk lid 56 of the automobile, if desired.

A forwardly inclined platform shown generally at 23 is pivotally mounted on the forward cross-support member 15 and releasably supported rearwardly thereof on the intermediate cross-support member 19 and on the arms 11a of the U-shaped frame 11.

The platform 23 is preferably comprised of two sections made up of tubular metal frame members and perforated metal mesh. The rear platform section 24 has a pair of longitudinally extending tubular members 25 connected across their rear ends by a rear tubular member 26. The platform mesh 27 is secured to the underside of the tubular members 25 and over the top of the rear tubular member 26. This permits the track 58 and skis 59 of the snowmobile to be slid over the rear member 26 onto the platform mesh while the longitudinal members 25 act as guides to keep the snowmobile centered on the carrier platform.

The rear platform section 24 also has a pair of platform flanges 28 disposed laterally adjacent the longitudinal members 25 for supporting the skis of the snowmobile.

The front section 29 of the platform 23 has a pair of longitudinal members 30 which telescope into the forward ends of tubular members 25 to form the carrier platform. The forward section 29 has a pair of U-shaped attaching members 31 which hook on the front cross-support member 15 as shown in FIG. 1. The front end of the rear section 24 of the carrier platform is supported on the vertically adjustable intermediate cross member 19 by a pair of inverted U-shaped channels 32 secured to the underside of the front cross-tube 33 of the rear section.

The rear tubular member 26 of the rear section 24 of the carrier platform is supported in a pair of upwardly open cradle members 34 on the upper ends of the frame arms 11a. The rear section of the platform is secured to the U-shaped frame by a removable bolt 35.

A pair of winches 36 are mounted on the flanges 28 of the rear section of the carrier platform for drawing the snowmobile onto the platform.

The carrier also has a removable locking bar 37 which extends across the platform into two tubular members 38 welded on the flange portions of the platform. The locking bar extends across the skis 59 of the snowmobile and may be secured in place by a bolt shown at 39 or a padlock 40 extending through the end of the bar.

The rear tubular member 26 has a pair of upwardly open ramp support channels 41 on which ramp members 42 are hooked as shown in FIG. 1. The ramp members are preferably hinged or telescoping so that they can be conveniently carried on the rear section 24 of the carrier platform between the skis of the snowmobile.

To load the snowmobile onto the carrier, the ramp members 42 are first hooked in place in channels 41. The winch cables 36a are hooked on the skis 59 and the snowmobile is winched up the ramp and carrier to the position shown in FIG. 1. The ratchet-type winches hold the snowmobile in place and the locking bar 37 is inserted over the skis through the tubular members 38. The bar may be locked in place by tightening bolt 39 and/or securing a padlock on the end of the bar to prevent withdrawal of the bar. The ramp members are then unhooked and secured between the skis of the snowmobile whereupon the snowmobile is ready for hauling.

To unload the snowmobile, the ramp members are hooked in place and the winch ratchets released whereby the snowmobile can then be moved down the platform and ramp.

Our unique construction permits easy access to the trunk of the automobile on which the carrier is mounted. After removing the fastening bolt 35 the carrier platform 23 may be manually pivoted upwardly about the forward cross-support member 15 into the position shown in phantom in FIG. 1. If the intermediate cross-support suction cup assemblies 20 are mounted on the rear fenders 55 of the automobile as shown in FIG. 2, it is necessary to remove the intermediate cross-support assembly before raising the trunk lid of the automobile. However, if, as mentioned hereinbefore, the suction cup assemblies are mounted on the trunk lid rather than on the fenders, the trunk lid can merely be raised with the intermediate cross-support assembly in place.

As shown in FIG. 2, the carrier may be equipped with V-roller assemblies 43 and 44 for carrying a boat. The boat would be winched up the ramp and over the roller assemblies onto the carrier for hauling.

It is understood that our invention is not confined to the particular construction and arrangement of parts herein illustrated and described, but embraces all such modified forms thereof as come within the scope of the following claims.

We claim:

1. A snowmobile carrier for automobiles equipped with a trailer-hitch assembly adjacent the rear bumper, said carrier assembly comprising:
   a. a generally U-shaped support frame for mounting on the trailer-hitch assembly of an automobile,
   b. fastening means on said U-shaped support frame for engaging the rear bumper of an automobile to maintain said U-shaped support frame in substantially upright position,
   c. a forward cross-support member for mounting on the roof of an automobile,
   d. a forwardly inclined platform mounted on said forward cross-support member and supported rearwardly thereof on said U-shaped support frame,
      1. said platform having a rear section with a first pair of longitudinally extending members and a pair of platform flanges disposed laterally adjacent said longitudinally extending members, and
      2. said platform having a forward section with a second pair of longitudinally extending members engaging said first pair of longitudinally extending members of said rear platform section in telescoping relation, and
   e. winch means mounted on said platform for drawing a snowmobile up said platform.

2. The carrier as specified in claim 1 having a vertically adjustable intermediate cross-support assembly for mounting on an automobile to support said platform between said forward cross-support member and said rearwardly disposed U-shaped support frame.

3. The carrier as specified in claim 1 wherein said platform comprises perforated metal mesh on the underside of said first and second pairs of longitudinally extending members whereby said longitudinally extending members provide guide edges for the track of a snowmobile.

4. The carrier as specified in claim 1 having upwardly open cradle means on said U-shaped frame, the rear section of said platform having a rear end supported in said cradle means, and securing means for releasably fastening said rear end of said platform to said U-shaped support frame whereby said platform can be pivoted upwardly about said forward cross-support member when said securing means is released.

5. The carrier as specified in claim 1 having a first V-roller assembly mounted on the rear section of said platform and a second V-roller assembly mounted on the forward section of said platform for carrying a boat thereon.

6. The carrier as specified in claim 1 having an upwardly open ramp support channel on the rear section of said platform.